(12) United States Patent
Cullinan et al.

(10) Patent No.: US 10,649,003 B2
(45) Date of Patent: May 12, 2020

(54) COUPLED MULTISCALE POSITIONING OF ARRAYS OF PARALLEL, INDEPENDENTLY ACTUATED AND SIMULTANEOUSLY DRIVEN MODULAR SCANNING PROBE MICROSCOPES FOR HIGH-THROUGHPUT, IN-LINE, NANOSCALE MEASUREMENT OF FLEXIBLE, LARGE AREA, AND ROLL-TO-ROLL PROCESSES

(71) Applicant: Board of Regents, The University of Texas System, Austin, TX (US)

(72) Inventors: Michael A. Cullinan, Austin, TX (US); Liam Glazer Connolly, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 15/994,616

(22) Filed: May 31, 2018

(65) Prior Publication Data
US 2018/0348254 A1    Dec. 6, 2018

Related U.S. Application Data

(60) Provisional application No. 62/538,091, filed on Jul. 28, 2017, provisional application No. 62/514,295, filed on Jun. 2, 2017.

(51) Int. Cl.
*G01Q 10/02* (2010.01)
*G01Q 10/04* (2010.01)
(Continued)

(52) U.S. Cl.
CPC ............ *G01Q 10/02* (2013.01); *G01Q 10/04* (2013.01); *G01Q 60/24* (2013.01); *G01Q 70/06* (2013.01); *G01Q 60/34* (2013.01)

(58) Field of Classification Search
CPC ........ G01Q 10/02; G01Q 10/04; G01Q 60/24; G01Q 70/06; G01Q 60/34
(Continued)

(56) References Cited

U.S. PATENT DOCUMENTS

| | | | |
|---|---|---|---|
| 2014/0007306 A1* | 1/2014 | Baur | G01Q 70/06 850/1 |
| 2014/0162436 A1* | 6/2014 | Rolandi | B82Y 10/00 438/478 |

OTHER PUBLICATIONS

Yao, et al., (2017). Inline metrology of nanoscale features in semiconductor manufacturing systems. Precis. Eng., 47, 147-157.
(Continued)

*Primary Examiner* — Nicole M Ippolito
(74) *Attorney, Agent, or Firm* — Meunier Carlin & Curfman LLC

(57) ABSTRACT

Disclosed herein are devices, systems and methods for in-line, nanoscale metrology. One system comprises monolithic flexure mechanisms with integrated actuators that allow movement and positioning in two axes, with an extremely high degree of accuracy, of a structure comprising one or more scanning probes. This structure is suspended to prevent any destructive interference from a sample, which can be stationary or moving at a nonzero rate, and rigid or flexible in mechanical behavior. This system can be activated at startup and quickly actuate the structure to approach the surface of the sample. Once the system achieves the desired proximity between the one or more probes and the sample, the system maintains that position of the structure to a high degree of accuracy regardless of any disturbances. This array can be moved at varying speeds laterally to match the velocity of any continually moving substrates, thus enabling scanning of moving substrates.

28 Claims, 13 Drawing Sheets

(51) Int. Cl.
    *G01Q 60/24*     (2010.01)
    *G01Q 70/06*     (2010.01)
    *G01Q 60/34*     (2010.01)

(58) Field of Classification Search
    USPC .................................. 850/1, 2, 3, 4, 5, 6
    See application file for complete search history.

(56) References Cited

OTHER PUBLICATIONS

Zhou, et al., (2015). Precision design and control of a flexure-based roll-to-roll printing system. Precision Engineering, 45, 332-341.

Morse J, Workshop on Nanofabrication Technologies for Roll-to-Roll Processing, Sep. 27-28, 2011, Boston, MA.

Sarkar, et al., Transducers 2013, Barcelona, Spain, Jun. 16-20. "CMOS-MEMS dynamic FM atomic force microscope," in Transducers 2013, 2013, No. June, pp. 916-919.

Sarkar, et al., MEMS 2014, San Francisco, CA, USA, Jan. 26-30. Single-chip atomic force microscope with integrated Q-enhancement and isothermal scanning Neil Sarkar; Raafat R. Mansour Publication Year: 2014, pp. 789-792.

Schitter, et al., (2008). Design and input-shaping control of a novel scanner for high-speed atomic force microscopy. Mechatronics, 18:282.

Aphale, et al., (2008). Minimizing Scanning Errors in Piezoelectric Stack-Actuated Nanopositioning Platforms. IEEE Transactions on Nanotechnology 2008; 7(1):79-90.

Awtar, et al., (2013). Design of a Large Range XY Nanopositioning System. J. Mechanisms Robotics 2013; 5(2):021008.

Xu Q, IEEE on Robotics & Automation 2014, Hong Kong, China, May 31-Jun. 7.

Patil, et al., FEA analysis and experimental investigation of building blocks for flexural mechanism. 2015 International Conference on Nascent Technologies in the Engineering Field (ICNTE). 2015, Jan. 9-10.

Nathan, et al., "Flexible electronics: The next ubiquitous platform," Proc. IEEE, vol. 100, No. SPL Content, pp. 1486-1517, 2012.

Roy, et al., "Design of a Flexure Based XY Precision Nanopositioner with a Two-Inch Travel Range for Micro-Scale Selective Laser Sintering," Proc. Annu. Meet. Am. Soc. Precis. Eng. 31st Annu. Meet., pp. 1-2, 2016.

\* cited by examiner

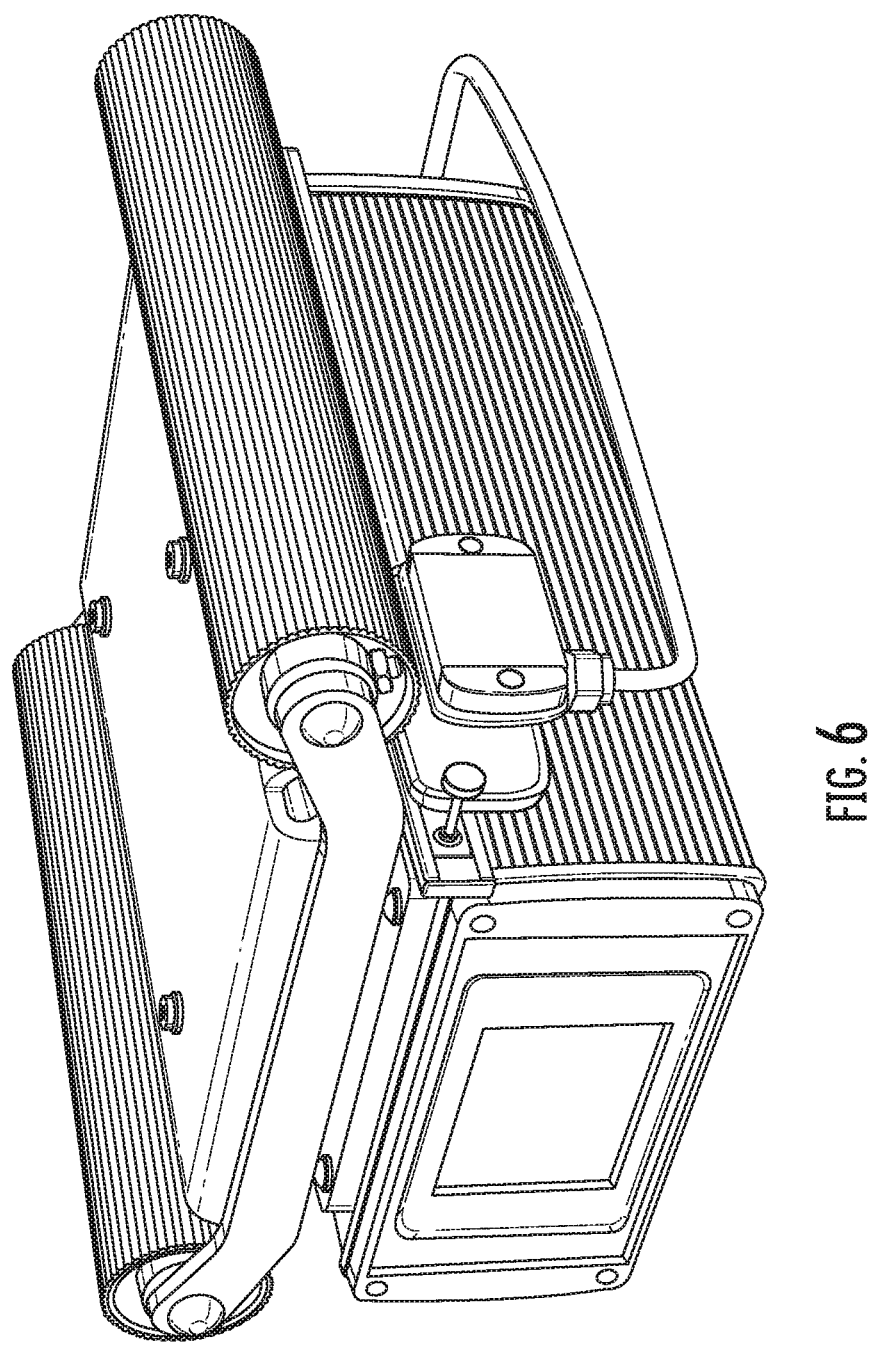

COUPLED MULTISCALE POSITIONING OF ARRAYS OF PARALLEL, INDEPENDENTLY ACTUATED AND SIMULTANEOUSLY DRIVEN MODULAR SCANNING PROBE MICROSCOPES FOR HIGH-THROUGHPUT, IN-LINE, NANOSCALE MEASUREMENT OF FLEXIBLE, LARGE AREA, AND ROLL-TO-ROLL PROCESSES

CROSS-REFERENCE TO RELATED APPLICATIONS

This application claims priority to and benefit of U.S. provisional patent application Ser. No. 62/514,295 filed Jun. 2, 2017 and U.S. provisional patent application Ser. No. 62/538,091 filed Jul. 28, 2017, both of which are fully incorporated by reference and made a part hereof.

BACKGROUND

Nanoscale materials and devices have proven to vastly improve upon a wide range of industries with significantly increased performance and novel functions. Moreover, metamaterials, films, materials, and devices fabricated on a flexible substrate have shown extreme promise due to their low weight, mechanical flexibility and durability, with a low projected cost and large area processing, especially when comparing flexible electronic devices to their traditional, silicon wafer based counterparts. Devices with applications ranging from water purification, wearable sensor arrays, displays, batteries, photovoltaic cells and supercapacitors in a multitude of industries such as healthcare, transportation, energy, mobile devices, and embedded systems are found to have improved performance at lower cost when compared to traditional microscale electronics. The same can be said for a plethora of photonic films, metamaterials, and other products based upon flexible, nanostructured patterns. The proliferation of these promising devices will bring truly enormous benefit to society.

However, one of the barriers to the widespread adoption of this methodology is the challenge in transitioning from small research-scale fabrication to large volume production. This issue is rooted in two conditions necessary for the viability of a new technology. First, the yield of the production must be high enough to justify mass manufacturing cost and second, the capital development costs to transition from prototype to volume-scale manufacturing must not exceed potential gains. These factors are highly dependent on the ability to conduct fast and accurate metrology. Implementation of production speed, in-line, direct metrology with nanoscale resolution represents a marked increase in feedback for the purposes of, among others, process control and yield enhancement.

A barrier to consumer-grade and volume-scale adoption of these types of products is the difficulty in accurately measuring fabricated structures on the nano-scale and conducting effective defect detection. The ability to conduct fast and accurate in-line metrology is critical to pushing yields high enough to justify manufacturing and R&D costs.

This growing need for accurate measurement and evaluation of fabricated nano-structures has led to widespread use of scanning probe microscope, including atomic force microscopy (AFM), in a variety of industrial and research settings. Almost all current direct measurement instruments, such as AFMs, require the use of extremely expensive and delicate optical and motion equipment. While very accurate, traditional implementations seen in widely available commercial products are not compact and require a significant amount of specialized and bulky systems, which makes it ill-suited for high-throughput, in-line measurement applications. For instance, in the fabrication of semiconductor devices, wafers will periodically be taken out of the assembly line and imaged with a large, bench scale or room scale AFM system to ensure fabrication has occurred within the optimal parameters for meeting critical dimensions and defect levels. However, the majority of these systems are relatively slow to scan and can only measure a single area of a less than a square millimeter. This makes it very difficult to extrapolate larger conclusions about the centimeter or meter scale sample from just a single scan, necessitating multiple "step-and-scans" and thus further decreasing throughput. As any nanofabrication or nanosculpting process will experience variation over a large working substrate, and certain metrology marks and structures in "hotspots" strategically spaced across the working substrate, usually on the millimeter or centimeter scale, help extrapolate the larger picture of fabrication quality while measuring all these hotspots quickly and accurately. Moreover, even in the small number of products that utilize multiple AFM tips to image a sample, they are arranged in a tight array with tip spacing usually on the microscale and all sharing a common ground structure to which the fixed end of the AFM cantilever is attached. which makes processing on non-planar or non-rigid samples a near impossibility and severely limits hotspot scanning throughput. Further, due to the difficult in quickly (e.g. without limiting production throughput of the R2R process) and precisely measuring nanostructures on a flexible substrate, in flexible, roll-to-roll (R2R) processes manufacturers are typically limited to the information provided by indirect, primarily optical, measurement techniques which lack the ability to quantify individual critical features or dimensions.

Therefore, what are needed are devices, systems and methods that overcome challenges in the present art, some of which are described above.

SUMMARY

Described and disclosed herein are systems, methods and apparatus for the individual control and actuation of each individual scanning tip probe in an array, independent of, and without contacting one another, in such a manner that each probe maintains a desired distance above a specimen to be measured. Instead of grouped together, this array is spaced in such a fashion that an area orders of magnitude larger than scan areas in current systems may be measured across large substrates at non-uniform sample heights. This array itself is positioned with a high degree of accuracy such that it is continually controlled to maintain a set precise location. This makes the system robust in a fashion such that processing or imaging using a physical probe can occur in-line with manufacturing processes and on materials which are not necessarily rigid nor stationary. Further, this array can be moved at varying speeds laterally to match the velocity of any continually moving substrates, thus enabling scanning of moving substrates.

AFM technology has enabled a new class of compact measurement devices. For example, MEMS-based AFM devices (as available from ICSPI Corp., Waterloo, ON, Canada, among others) work by utilizing electrothermal actuators coupled to flexure mechanisms to control lateral movement of a cantilevered AFM tip and a vertical bimorph for moving the tip relative to the surface of the sample. The AFM device may also comprise strain gauges to measure the interaction force between the sample and AFM tip. A closed loop feedback control system can be used to maintain a constant height above the sample. The magnitude of the voltage outputted to the chip to maintain this height is measured and, in conjunction with a calibration, can be utilized to record the surface topology of the sample. As described herein, by implementing a stacked nanopositioning system in concert with this AFM-on-a-chip technology in a coupled design, a low-cost system can accurately and precisely measure surface topology of nanopatterned electronic devices, films, metamaterials, and other devices such as to fulfill the role of an inline, probe-based nanometrology device for R2R manufacturing.

Other systems, methods, apparatus, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other and like reference numerals designate corresponding parts throughout the several views:

FIG. 6 is an image of an exemplary pivoting web guide subsystem;

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
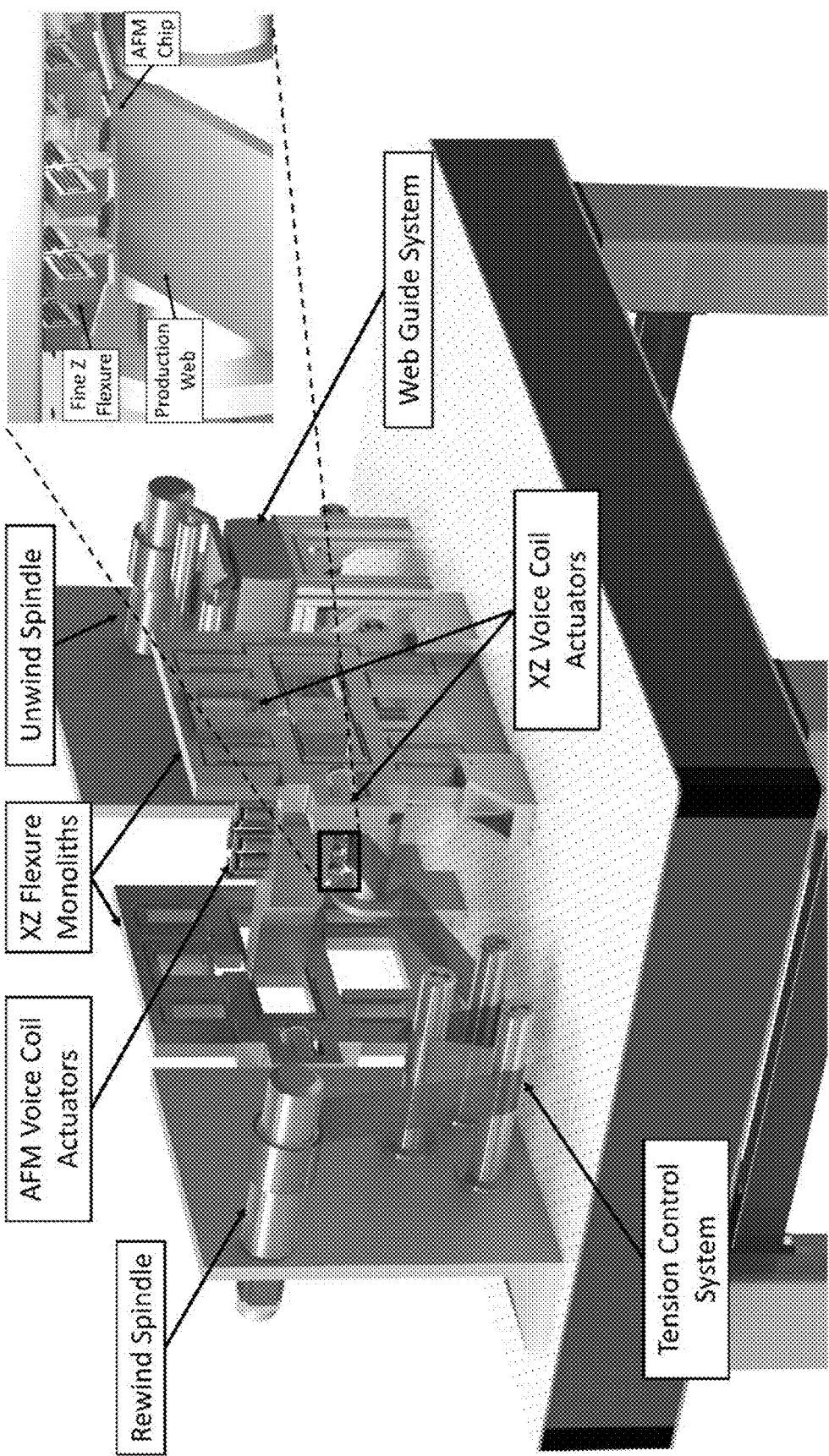
FIG. 1 is an illustration of an embodiment of an exemplary R2R metrology system.

Described herein are embodiments of a compound, nanopositioning system, in this case with stacked flexure-hinge mechanisms driven by noncontact voice coil actuators. In concert with novel single chip Atomic Force Microscope (sc-AFM) technology, this coupled, multi-flexure positioning system can be uses as a probe-based metrology device. The exemplary system is designed for the purpose of process control in roll-to-roll (R2R) nanofabrication. FIG. 1 is an illustration of an embodiment of an exemplary R2R metrology system, as described herein.

Generally, embodiments of the exemplary R2R metrology system described herein are comprised of a plurality of subsystems. Such subsystems may include an unwind-rewind subsystem, a tension measurement subsystem, a metrology subsystem, and a web guiding subsystem. Each of these subsystems are further described below.

Figure 2:
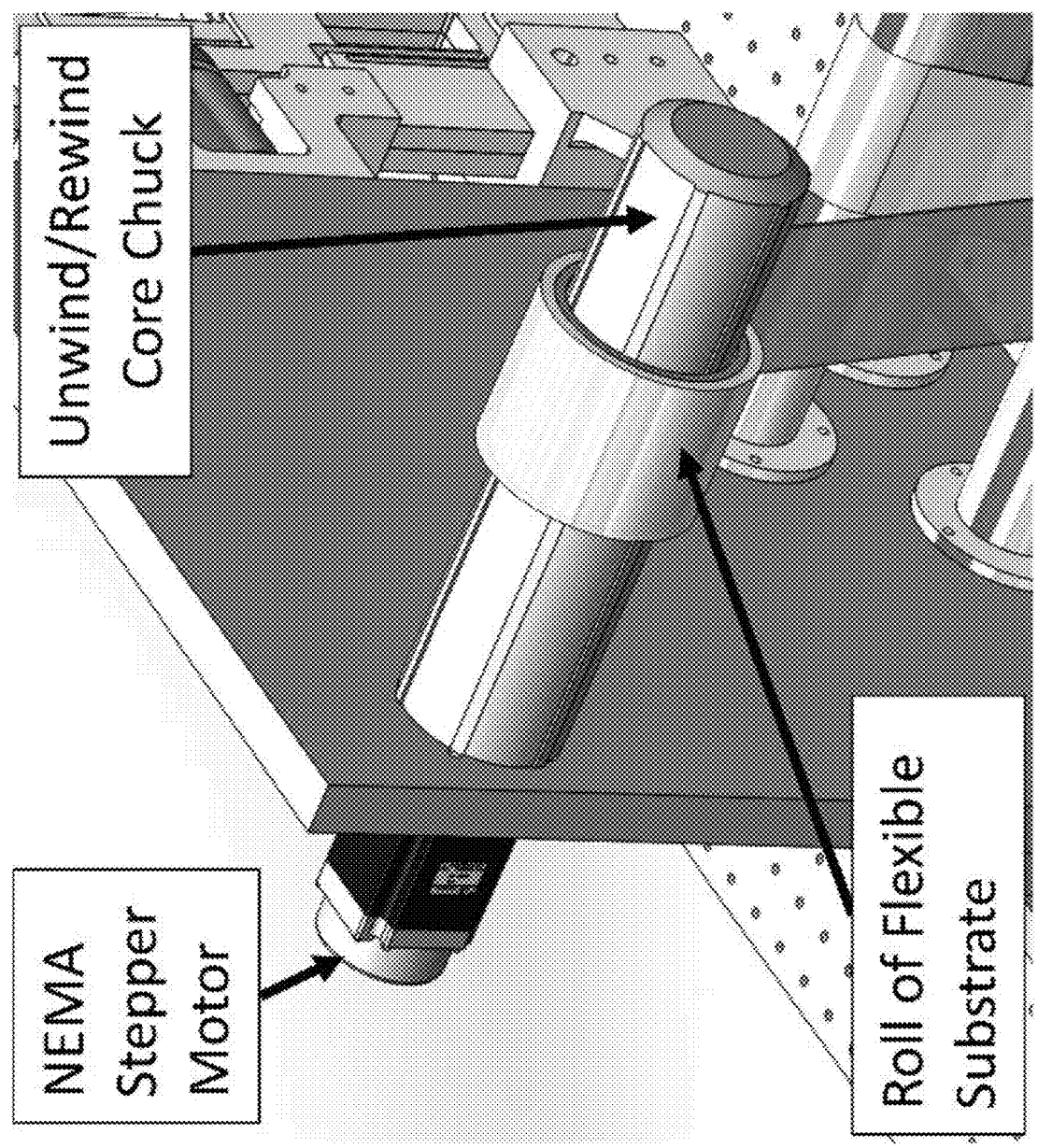
FIG. 2 is an illustration of an exemplary cantilevered unwind/rewind subsystem.

The material that flows through the R2R system is regulated by the unwind-rewind subsystem. FIG. 2 is an illustration of an exemplary cantilevered unwind/rewind subsystem. The flexible electronic devices or other flexible material with fabricated structures to be evaluated move on a substrate (e.g., web) with a specific velocity from spools at either end of the system. In some embodiments, these spools can be mounted on cantilevered core chucks and driven by motors. By regulating the speed of these motors tension control can also be achieved. Through a managed difference in the angular velocities of the independent unwind and rewind spools, a desired level of web tension for measurement is achieved in addition to the primary role of this subsystem, regulating the overall lateral speed of the web line. This tension level is very small in comparison to typical industrial systems. It serves to ensure that the web is fully taught when moving through the system, and is flush when passing over the polished, stainless steel metrology roller.

Figure 3:
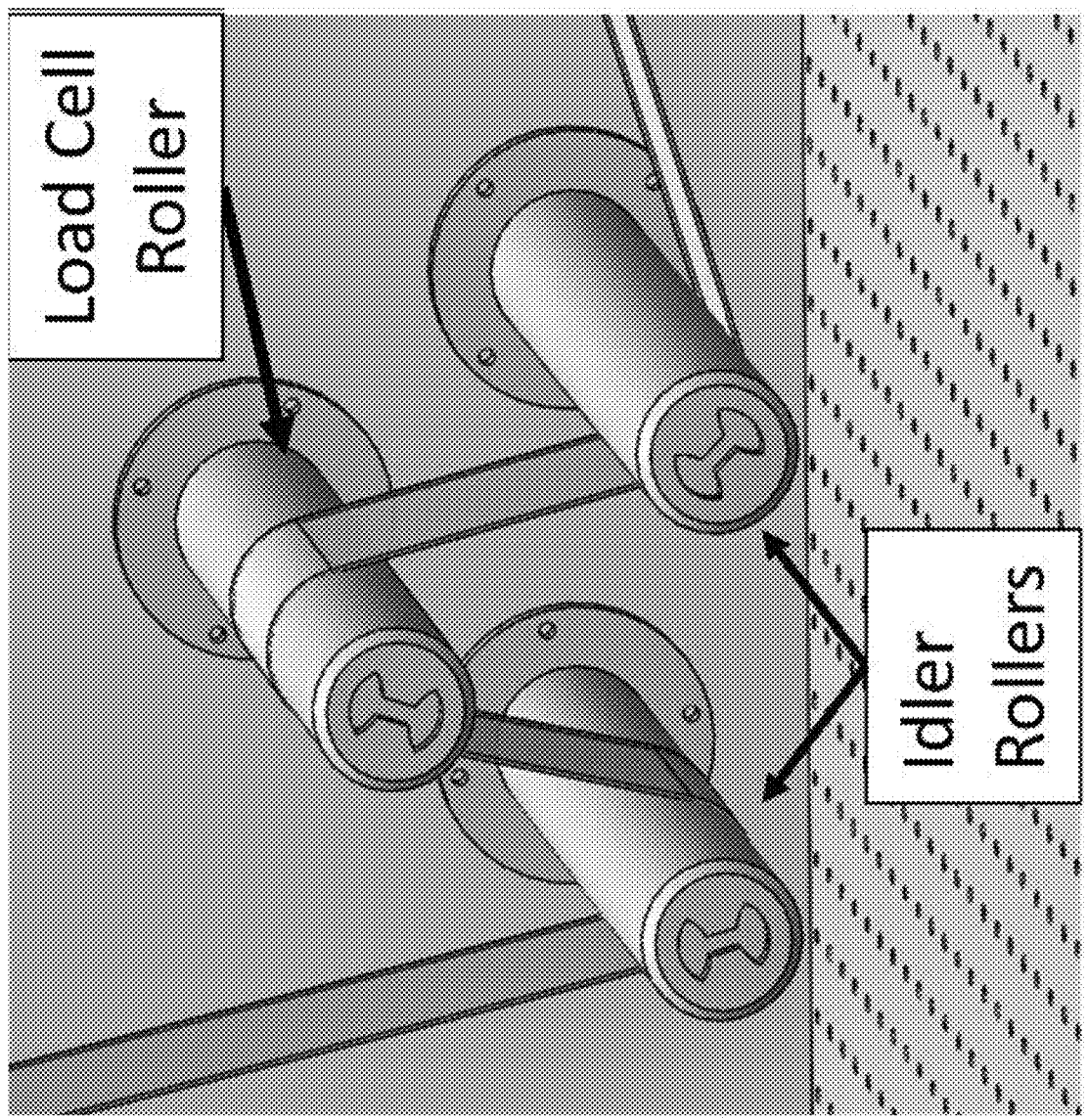
FIG. 3 is an illustration of an exemplary cantilevered load cell and tension measurement subsystem.

FIG. 3 is an illustration of an exemplary cantilevered load cell and tension measurement subsystem. To ensure that the modulation of web tension is accurate, the tension measurement subsystem continuously measures the tension of the flexible substrate. In one aspect, this is accomplished by a cantilevered, narrow-web force transducer (available from, for example, Dover Flexo Corp., Rochester, N.H.) flanked by two idler rollers, free-spinning rollers that act as simple supports, as shown in FIG. 3. This embodiment of the tension measurement subsystem uses a calibrated strain gauge arrangement to continuously measure web tension. By isolating the force transducer with idler rollers, an accurate reading of tension is taken and used as a feedback signal to determine error relative to the web tension set-point for the closed-loop control of the unwind and rewind velocity delta.

Figure 4:
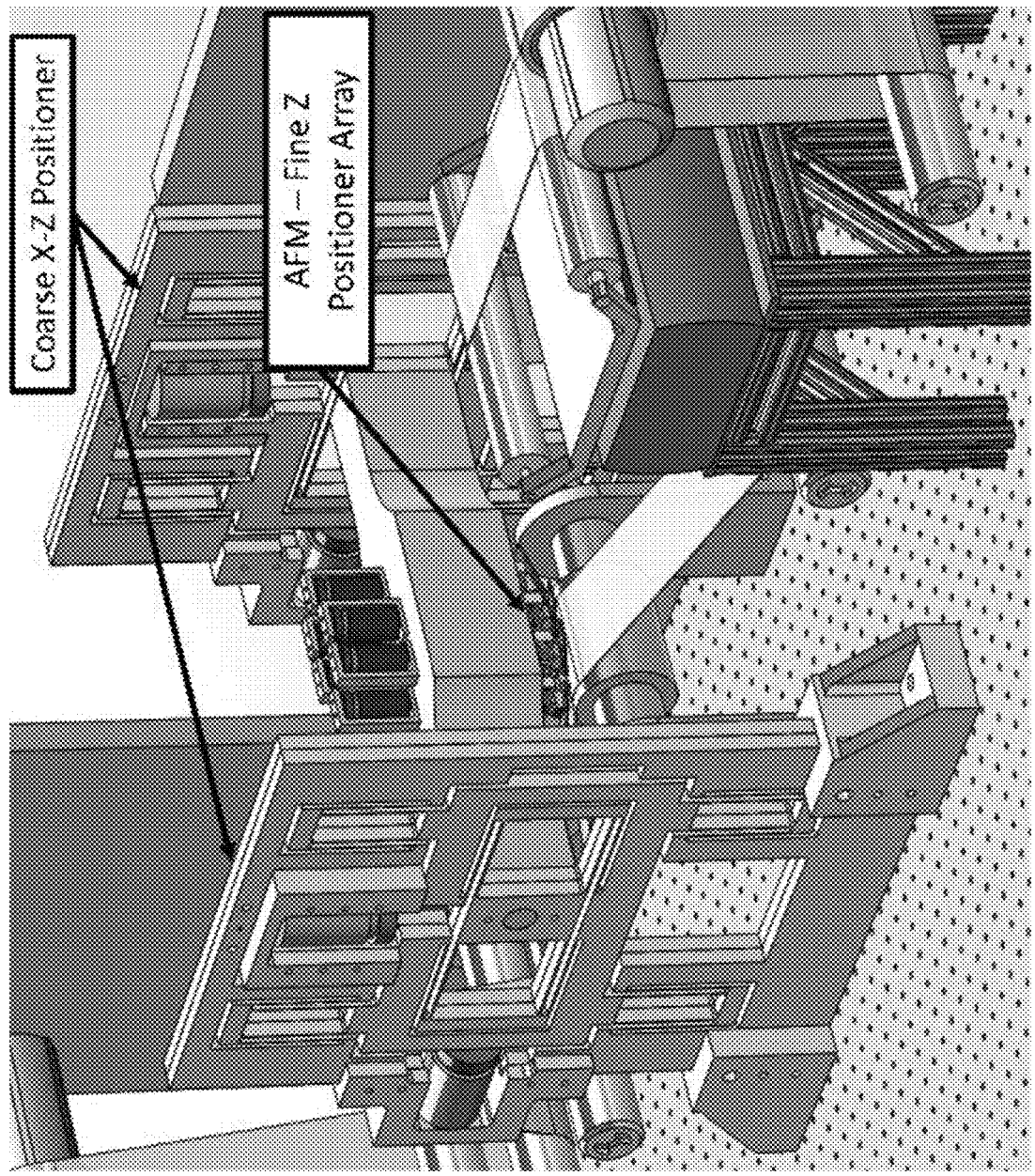
FIG. 4 is an illustration of an exemplary metrology subsystem having a stacked flexure design.

FIG. 4 is an illustration of an exemplary metrology subsystem having a stacked flexure design. The web passes over a large, smooth, stainless steel idler roller and the surface topology is measured by one or more AFMs mounted over the precipice of this roller (referred to herein as an "AFM array"). To enable approach during system startup along with the ability to easily perform system maintenance or swap web samples, the positioning of the AFM chips that comprise the AFM array is split into two paradigms: coarse and fine positioning, as shown in FIG. 5.

In one non-limiting example, two vertical, two axis, symmetrical flexure mechanism monoliths, each comprising two flexure plates, are bolted and connected to one another by a substantially rigid structure. This structure provides positioning of the AFM array, which are attached to this structure by means of another "approach" double parallelogram flexure mechanism. This structure positioning system moves the sc-AFMs that comprise the AFM array in the X and Z directions to within approximately 250 μm of the web line and holds them there during system startup, providing isolation from external disturbances by use of the aforementioned mechanism and a voice coil actuator (for example, a MotiCont, LVCM-051-064-02, Van Nuys, Calif.) with position feedback provided by high accuracy capacitance probes (LION Precision).

This chosen design parameters for the exemplary coarse flexure monolith enable both accurate positioning of the mounting-bar holding the array of AFM chips that comprise the AFM array while also providing a large enough range of motion to ensure that the AFM tips never passively contact the web line in a destructive manner. Further, the resonant modes of this exemplary design were evaluated by FEA to ensure that the system could operate at a frequency high enough to accurately position the AFM array.

Figure 5:
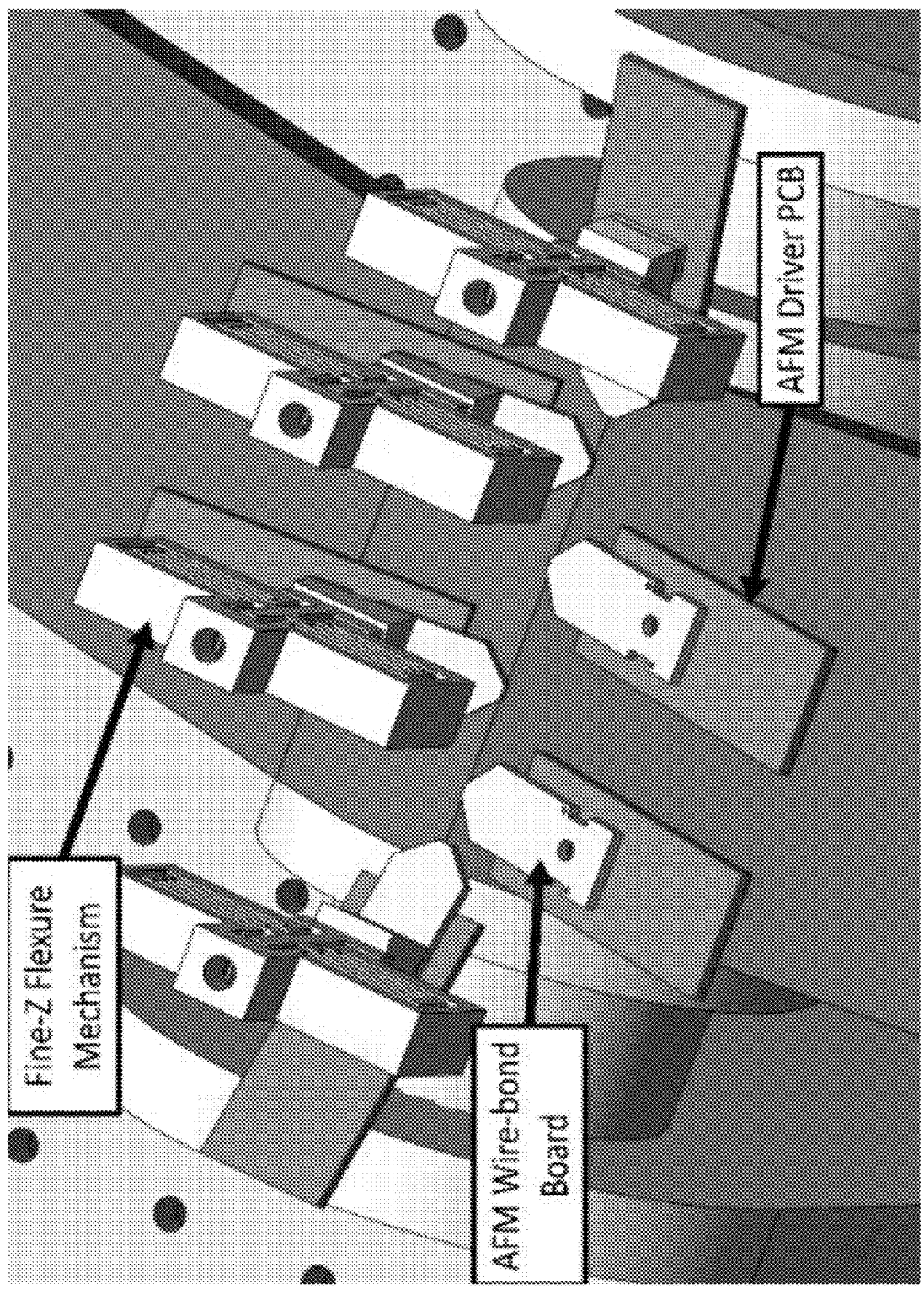
FIG. 5 is an illustration of an exemplary individual AFM positioner array layout.

The fine approach of each individual AFM on the rigid bar is provided by the actuation of an array of Fine-Z flexure mechanisms, as shown in FIG. 5. These Fine-Z flexure mechanisms can be separately controlled by independent voice coil actuators. Feedback to these Fine-Z flexure mechanisms is provided by onboard sensors integrated with the AFM device. Such onboard sensors may be a piezo resistive strain sensor for the cantilevered tip or strain gages, mounted on each individual Fine-Z flexure beam and calibrated to the same accuracy as the capacitance probes. This allows real-time, individual adjustment of each AFM chip such that the desired separation distance between the AFM and the web is maintained; that the chip remains within the MEMS vertical thermoelectric actuation systems' range of approximately 10 μm; and that the chip experiences no large external disturbances.

In one aspect, vertical and horizontal actuation systems in the AFM devices scan each cantilever tip in a non-contact "tapping" mode to determine surface topology data. This allows for three separate, compound levels of isolation from any outside disturbances insuring optimal data collection.

In one example, incorporation of a symmetric flexure mechanisms allows for the fine adjustment of AFM position in the Z-axis. This flexure provides nanometer scale positioning of the AFM once it is moved to within approximately 200 μm of the web line. The exemplary design of this flexure mechanism was optimized to provide better than 10 nm of accuracy in Z position.

The web line passes through a pivoting web-guide subsystem before it reaches the metrology subsystem. The web-guide subsystem actuates a pivoting table to adjust the positioning of the web as it passes through the system. Using infrared sensors, the web-guide subsystem continually modifies the lateral position of the web to negate any external disturbances present in the web line. This can achieve a lateral position accuracy of less than approximately 500 μm of error in the set position.

FIG. 6 is an illustration of an exemplary pivoting web-guide subsystem that can be used in some embodiments (ARIS, Roll 2 Roll Technologies, LLC).

System Operation

Disclosed and described herein are systems, methods and devices for metrology that can be used in manufacturing. One exemplary metrology system comprises two monolithic flexure mechanisms with integrated actuators which allow the movement and positioning in two axes (hereby referred to as axis one or X axis, and axis two or Z axis), with a high degree of accuracy, of a structure comprising an array of parallel, independently actuated and controlled sc-AFM probes. This structure is suspended away from the sample being measured. The measured sample can be stationary or moving at a nonzero rate, such as to prevent any destructive interference. This metrology system, which passively sits away from the sample in both the one (X) axis and the two (Z) axis, is activated at system startup and quickly actuates the structure to approach the surface of the sample. Once the AFMs are brought near enough to the sample, the metrology system maintains that position of the structure with nanoscale accuracy regardless of the disturbances present from the ground. The independently actuated and automatically controlled sc-AFM probes rapidly position themselves in axis two (Z axis) to just above the sample where the sc-AFM probes, with integrated cantilever scanning and sensing systems, can be used for in-line micro and nano metrology, defect detection, statistical process control, topology analysis, AFM based CNC etching, or any other scanning probe based processing or imaging techniques in the physical, thermal, magnetic, electrical, or any other dimension, or multiple dimensions at once. Embodiments of the disclosed metrology system can be used for both moving and stationary, rigid and flexible samples. If the scan is performed on a moving sample, then the array containing the independently controlled modular sc-AFM probes can be dynamically positioned in the Z axis to account for any errors or eccentricity in the roller on which the sample is being measured based on an offline map. Because each probe is actuated and controlled individually and automatically, the throughput of the device is directly scalable to the number of probes held in the structure. Embodiments of the disclosed metrology system are particularly applicable to metrology for roll-to-roll manufacturing processes. Due to its compact nature and scalable width, embodiments of the metrology system can be used to directly measure nanoscale features on flexible substrates of varying width in a non-contact, non-destructive manner.

Figure 7A:
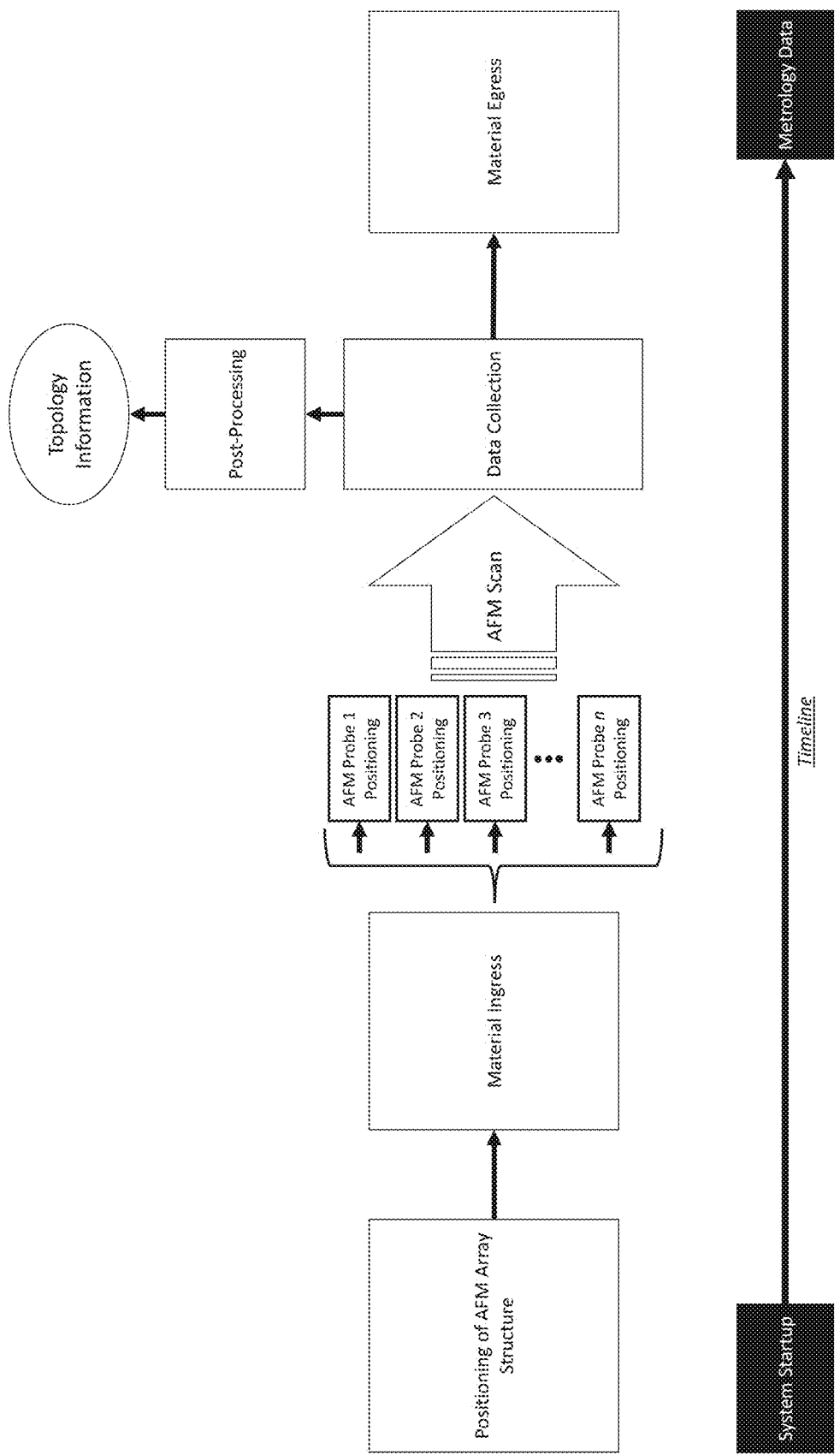
FIG. 7A illustrates basic system operation with respect to time and how valuable metrology data is produced by the system.

FIG. 7A illustrates basic system operation with respect to time and how valuable metrology data is produced by the system. In its idle state, an array of AFM probes is held away from a sample being imaged to avoid any collisions between the delicate AFM tips and the substrate. Afterwards, the material being measured, for instance a roll of flexible material or devices, is moved until the region of interest is directly below the array of AFM tips. At this point each AFM probe is individually moved to an optimal distance above the sample, regardless of any local variance or features which produce non-uniform sample heights.

Figure 7B:
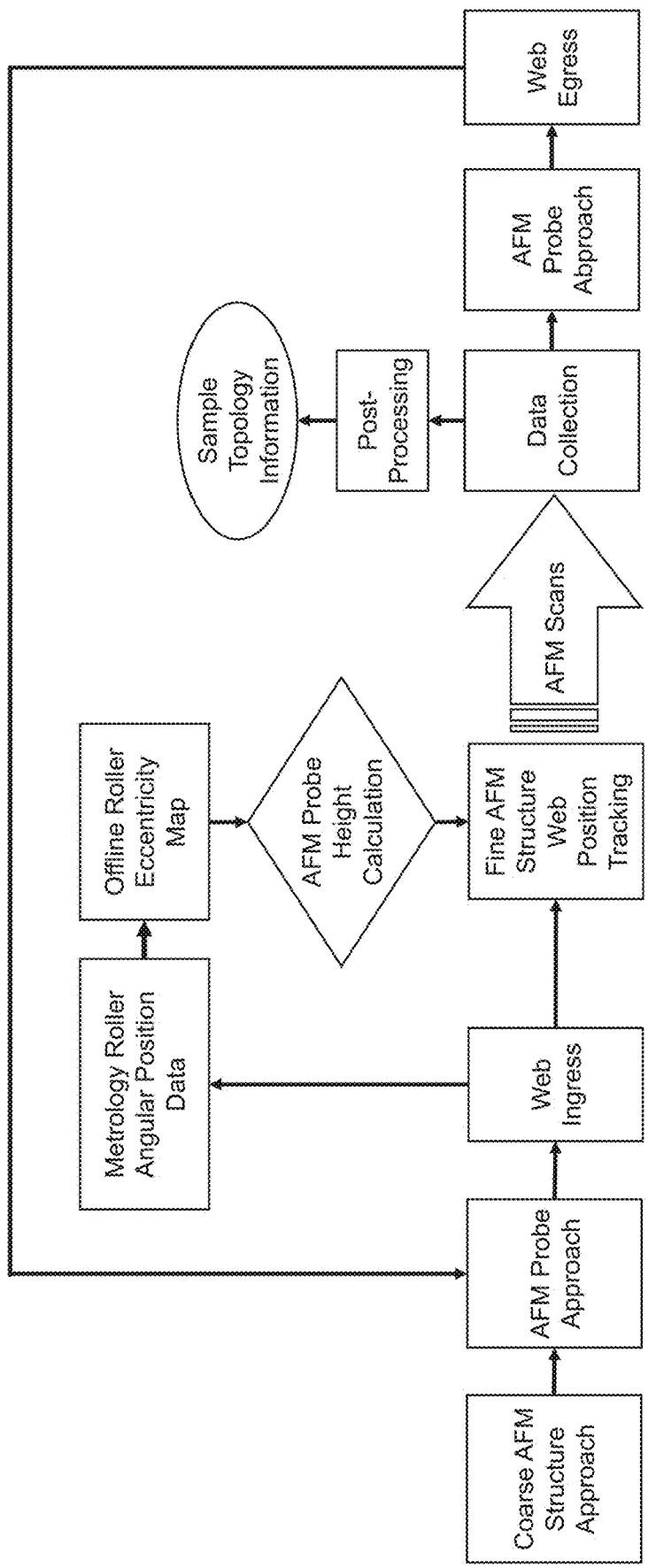
FIG. 7B illustrates system operation in a roll-to-roll environment, and includes considerations for compensation for error in the roller on which the substrate (web) is being measured and shows continuity of system operation.

FIG. 7B illustrates system operation in a roll-to-roll environment where a single sc-AFM scans the flexible substrate on a circular roller exemplary of a typical roll-to-roll system component. This system methodology includes a method for the compensation for eccentricity, topology, and other errors in the vertical separation between roller on which the substrate (web) is being measured and the sc-AFM tip as the roller rotates. The figure also shows continuity of system operation for continuous scanning of the nanoscale features on the flexible substrate in a roll-to-roll nanomanufacturing environment.

Figure 7C:
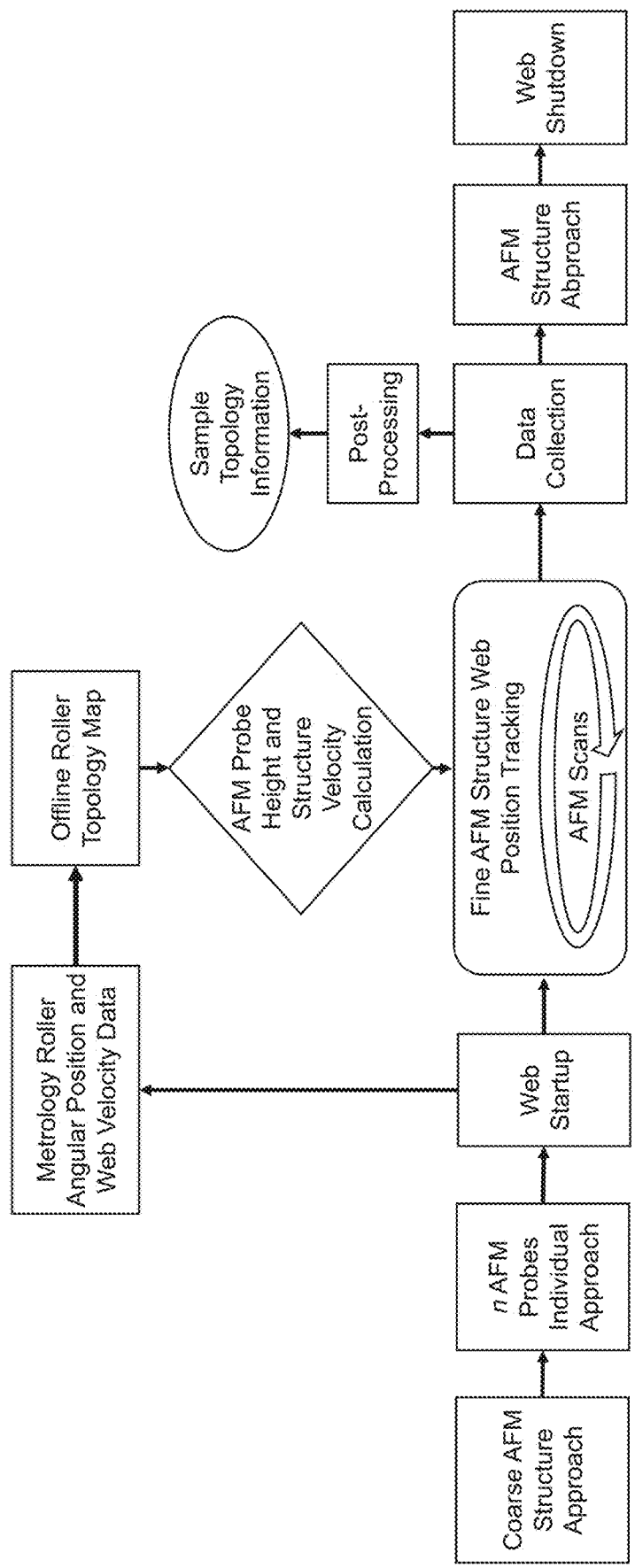
FIG. 7C illustrates system operation in a situation where the measurement is taking place without the web of a roll-to-roll system halting movement.

FIG. 7C illustrates exemplary operation of a nanometrology system in which n number of probes operate in parallel, in that each sc-AFM is scanning different areas across the width of the flexible substrate (web). his operational methodology allows for continuous flow of the web in the machine direction because the AFM scans occur in a manner such that the AFM support structure matches the speed of the web to a precise degree, eliminating the necessity for the web to halt during AFM scans.

Figure 8A:
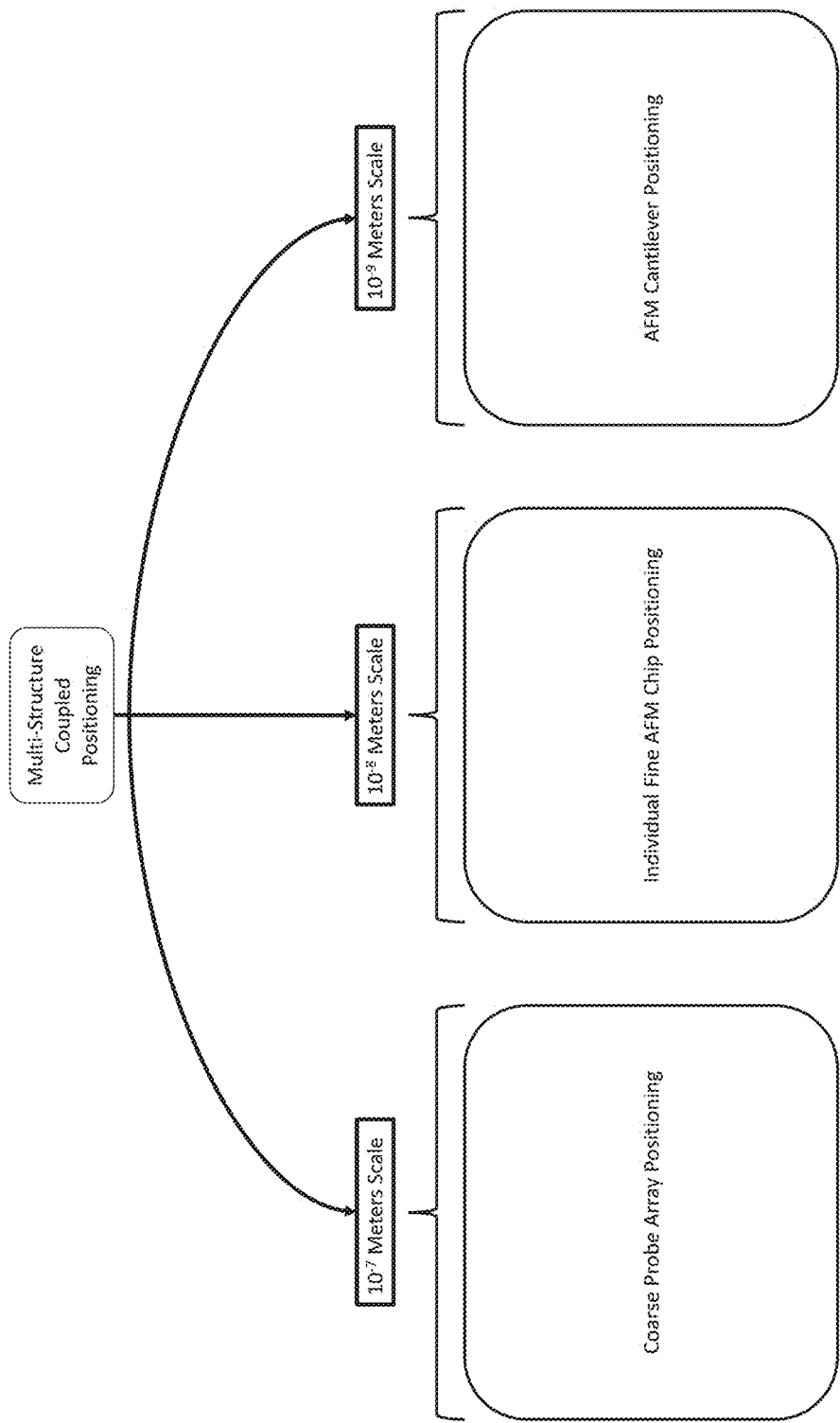
FIG. 8A illustrates the hierarchy for how the different compliant mechanisms which allow motion in the Z axis are positioned, how each is controlled independently, and the degree of positioning accuracy achieved in each mechanism.

FIG. 8A illustrates the hierarchy for how the different compliant mechanisms which allow motion in the Z axis are positioned, how each is controlled independently, and the degree of positioning accuracy achieved in each mechanism.

Figure 8B:
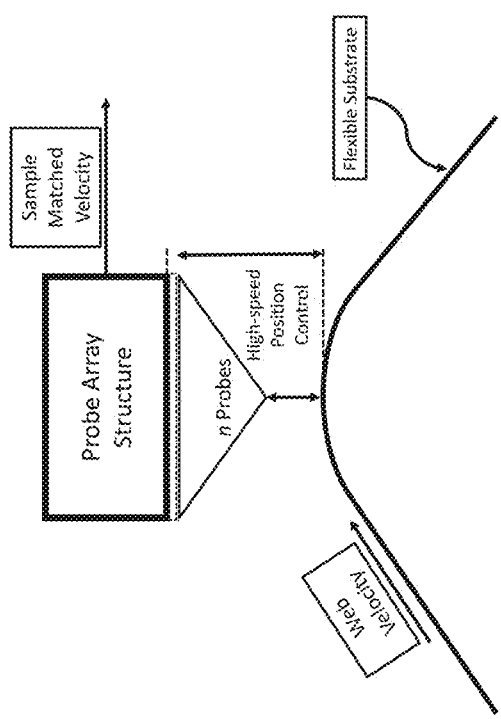
FIG. 8B illustrates distances controlled for when measuring on a moving web.

FIG. 8B illustrates how the structure containing the n sc-AFM probes may be actuated to control for velocity in order to match the web speed in the machine direction for the sc-AFMs, which are also positioned vertically to a high degree of precision and at a high speed in order to maintain optimal tip-substrate separation distance, such that nanometrology data mat be acquired without the flexible substrate halting its' flow through the machine or manufacturing line to best integrate with existing roll-to-roll manufacturing principles and provide maximum cost reduction and yield enhancement benefit.

Figure 9:
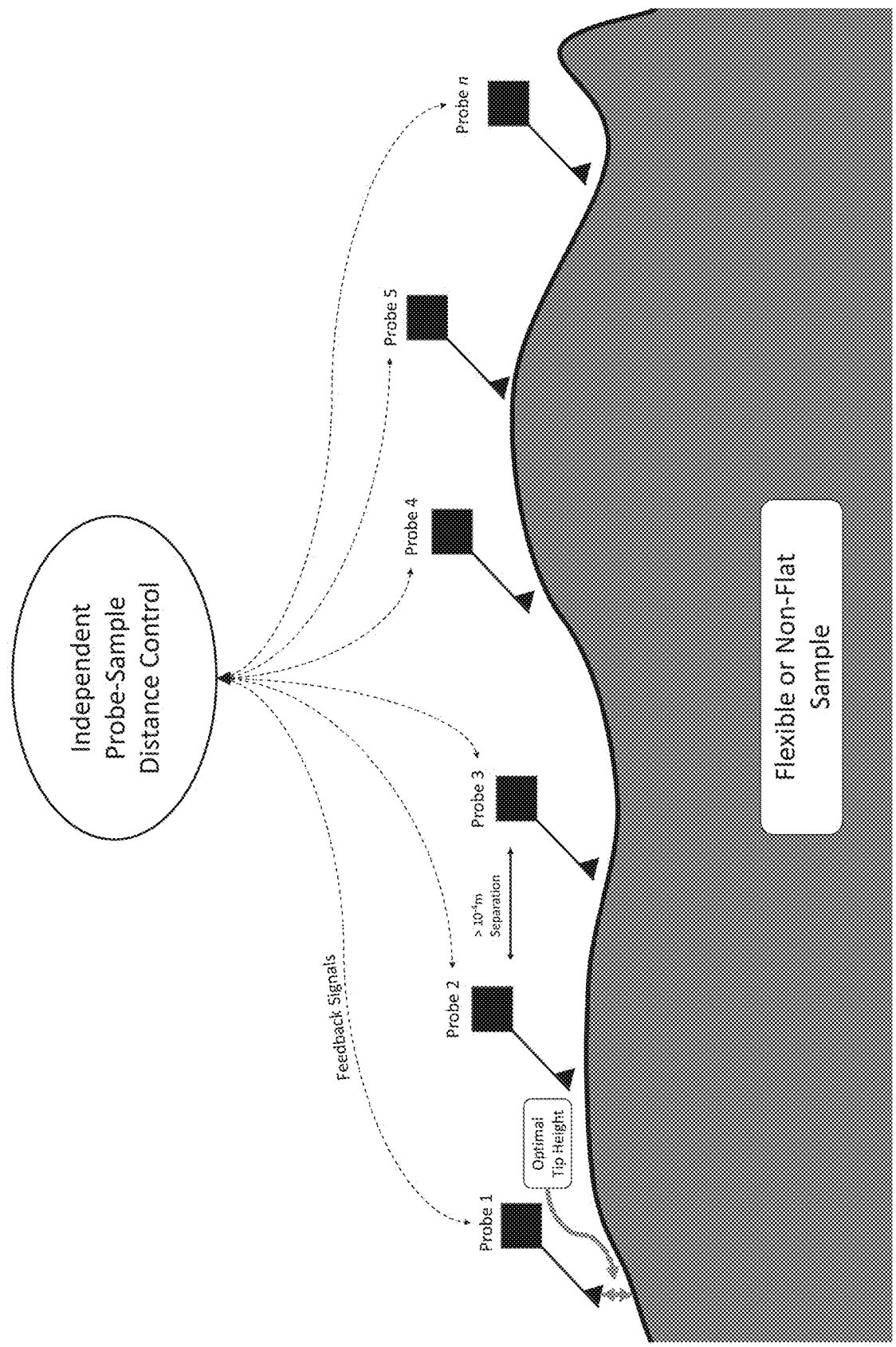
FIG. 9 illustrates independent control of each AFM probe in a parallel array of AFM probes.

FIG. 9 illustrates how independent control of each probe in the parallel array achieves optimal scan heights and nanometer-accurate scan data at each individual inspection area separated by many millimeters at different points of a flexible or non-flat sample. This methodology also enables the running of the system in a such a way that data scans occur while the substrate is actively in motion, with each probe maintaining an optimal tip height.

Advantageously, as a system for the measurement of specific topological or morphological quantities in-line with the manufacture of materials or devices, embodiments of the disclosed metrology system significantly reduce the amount of space required to perform equivalent measurements and vastly increase system throughput. Furthermore, embodiments of the disclosed metrology system isolates probes from any disturbance present in the environment by coupling multiple optimized flexure mechanism based positioning systems to actuate the probes in the X and the Z axis until such a point that the probe or probes are near enough to the sample being measured that the onboard actuators can manipulate the probe tip to collect data. Moreover, multiple sc-AFM probes can be positioned over a single substrate in a single precisely positioned structure. The number of probes that can be arrayed is only limited by the width of the sample to be measured and the length of the surface on which the sample is measured. Thus, the throughput of embodiments of the metrology system is highly expandable at a relatively small incremental cost. This enables measurement, evaluation, or processing of an area orders of magnitude larger than any other direct measurement currently available. Furthermore, because the embodiments of the disclosed metrology system are so compact, it is possible to put many individual systems in a single room of reasonable size.

Though not limited to this application, as a system/device for metrology, defect detection, and statistical process control, the disclosed system is able to accurately measure and quantify large sample areas in a quick, high throughput fashion, an extremely applicable process for R2R manufactured devices or products when combined with the compact design and low overall complexity.

Example Computing Device

Figure 10:
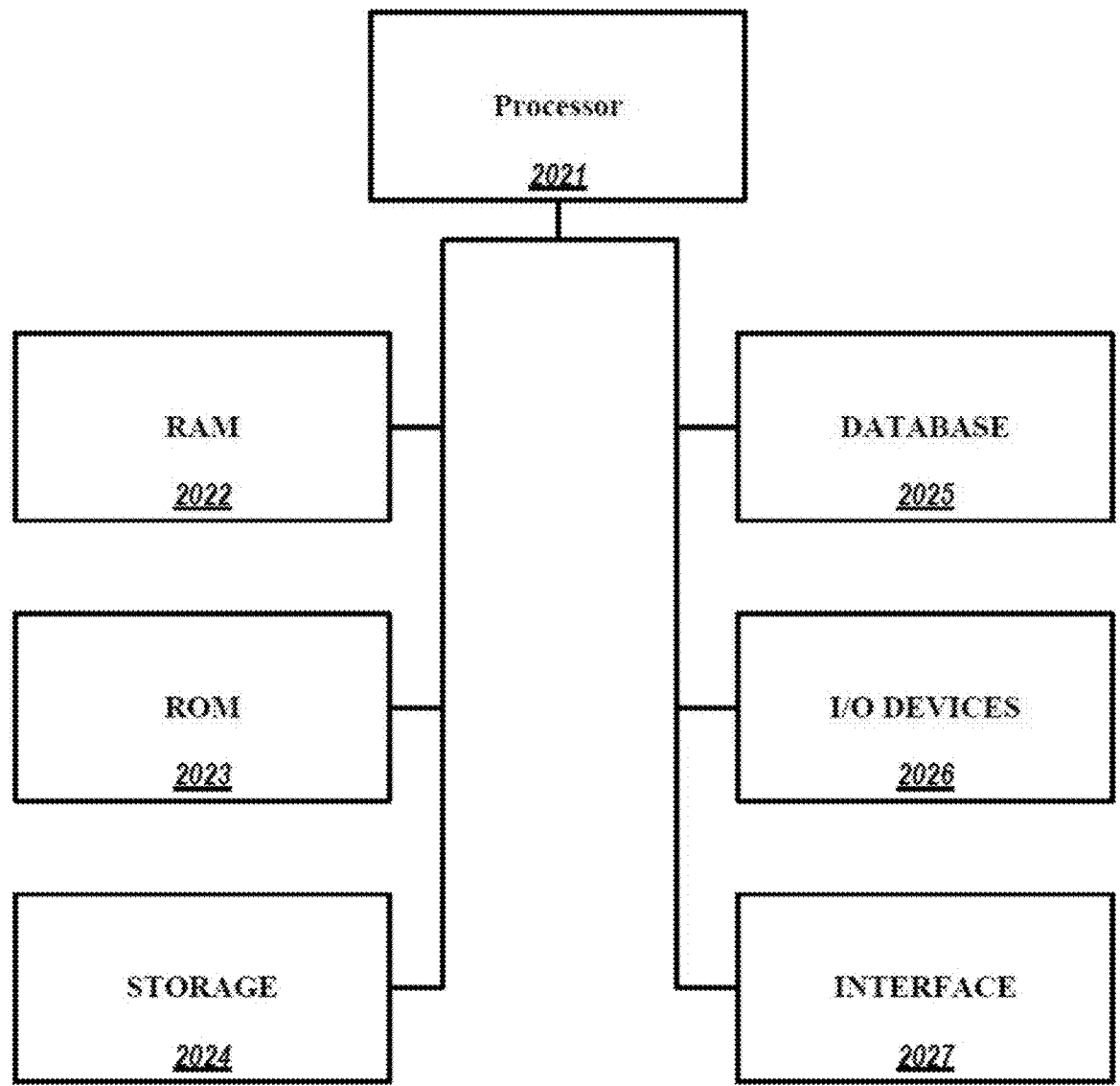
FIG. 10 illustrates an exemplary computer that can be used for controlling aspects of the disclosed metrology system.

As part of a manufacturing process, embodiments of the disclosed metrology system may have aspects that are controlled by a computing device. FIG. 10 illustrates an exemplary computer that can be used. As used herein, "computer" may include a plurality of computers. The computers may include one or more hardware components such as, for example, a processor 2021, a random access memory (RAM) module 2022, a read-only memory (ROM) module 2023, a storage 2024, a database 2025, one or more input/output (I/O) devices 2026, and an interface 2027. Alternatively and/or additionally, controller 2020 may include one or more software components such as, for example, a computer-readable medium including computer executable instructions for performing a method associated with the exemplary embodiments. It is contemplated that one or more of the hardware components listed above may be implemented using software. For example, storage 2024 may include a software partition associated with one or more other hardware components. It is understood that the components listed above are exemplary only and not intended to be limiting.

Processor 2021 may include one or more processors, each configured to execute instructions and process data to perform one or more functions associated with a computer for controlling a metrology system. Processor 2021 may be communicatively coupled to RAM 2022, ROM 2023, storage 2024, database 2025, I/O devices 2026, and interface 2027. Processor 2021 may be configured to execute sequences of computer program instructions to perform various processes. The computer program instructions may be loaded into RAM 2022 for execution by processor 2021. As used herein, processor refers to a physical hardware device that executes encoded instructions for performing functions on inputs and creating outputs.

RAM 2022 and ROM 2023 may each include one or more devices for storing information associated with operation of processor 2021. For example, ROM 2023 may include a memory device configured to access and store information associated with controller 2020, including information for identifying, initializing, and monitoring the operation of one or more components and subsystems. RAM 2022 may include a memory device for storing data associated with one or more operations of processor 2021. For example, ROM 2023 may load instructions into RAM 2022 for execution by processor 2021.

Storage 2024 may include any type of mass storage device configured to store information that processor 2021 may need to perform processes consistent with the disclosed embodiments. For example, storage 2024 may include one or more magnetic and/or optical disk devices, such as hard drives, CD-ROMs, DVD-ROMs, or any other type of mass media device.

Database 2025 may include one or more software and/or hardware components that cooperate to store, organize, sort, filter, and/or arrange data used by controller 2020 and/or processor 2021. For example, database 2025 may store hardware and/or software configuration data associated with input-output hardware devices and controllers, as described herein. It is contemplated that database 2025 may store additional and/or different information than that listed above.

I/O devices 2026 may include one or more components configured to communicate information with a user associated with controller 2020. For example, I/O devices may include a console with an integrated keyboard and mouse to allow a user to maintain a database of images, update associations, and access digital content. I/O devices 2026 may also include a display including a graphical user interface (GUI) for outputting information on a monitor. I/O devices 2026 may also include peripheral devices such as, for example, a printer for printing information associated with controller 2020, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 2027 may include one or more components configured to transmit and receive data via a communication network, such as the Internet, a local area network, a workstation peer-to-peer network, a direct link network, a wireless network, or any other suitable communication platform. For example, interface 2027 may include one or more modulators, demodulators, multiplexers, demultiplexers, network communication devices, wireless devices, antennas, modems, and any other type of device configured to enable data communication via a communication network.

In one specific, but non-limiting example, the computer comprises one or more National Instruments Compact RIO (cRIO) controllers (National Instruments, Austin, Tex.), which features a range of embedded controllers with two processing targets: (1) a real-time processor for communication and signal processing and (2) a user-programmable FPGA to implement high-speed control and custom timing and triggering directly in hardware. In this specific example, the computer runs its own modified Linux kernel/OS and interfaces with the FPGA.

CONCLUSION

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A metrology system comprising:
a structure positioning system that comprises a rigid structure that is supported at each end, wherein the rigid structure is actuated to alter a physical location of the rigid structure in at least two dimensions such that the rigid structure can be positioned relative to a direction of movement of a sample and a distance separating the rigid structure from the sample; and
a plurality of scanning probes, wherein each of the plurality of scanning probes is attached to a corresponding fine-z flexure mechanism and each fine-z flexure mechanism is suspended from the rigid structure and actuated by a corresponding actuator, wherein the actuators allow movement and positioning of each fine-z mechanism and its associated scanning probe in multiple directions and independent of the rigid structure.

2. The system of claim 1, wherein at least one of the plurality of scanning probes comprises a micro-electro-mechanical-systems (MEMS) based scanning cantilever probe.

3. The system of claim 2, wherein the MEMS probe comprises a MEMS atomic force microscopy (AFM) probe.

4. The system of claim 1, wherein the rigid structure is moved and positioned to control a physical location of at least one of the plurality of scanning probes in relation to a position and a velocity of the sample.

5. The system of claim 4, wherein the movement of the rigid structure or fine-z flexure mechanisms positions the at least one of the scanning probes to within approximately 250 µm of the sample.

6. The system of claim 4, wherein the sample is stationary.

7. The system of claim 4, wherein the sample is moving.

8. The system of claim 4, wherein the sample is rigid.

9. The system of claim 4, wherein the sample is flexible.

10. The system of claim 1, wherein a number of scanning probes that comprise the plurality of scanning probes is scalable.

11. The system of claim 10, wherein the plurality of scanning probes form an array of scanning probes.

12. The system of claim 1, wherein the system is used in line with a roll-to-roll manufacturing process.

13. The system of claim 1, wherein at least one of the plurality of scanning probes comprises a probe used for metrology data acquisition.

14. The system of claim 13, wherein the at least one scanning probe used for metrology data acquisition is used to measure one or more dimensions of temperature, magnetic information, and electric charge.

15. A method of metrology for manufacturing comprising:
providing a structure positioning system that comprises a rigid structure that is supported at each end, wherein the rigid structure is actuated to alter a physical location of the rigid structure in at least two dimensions such that the rigid structure can be positioned relative to a direction of movement of a sample and a distance separating the rigid structure from the sample;
providing a plurality of scanning probes, wherein each of the plurality of scanning probes is attached to a corresponding fine-z flexure mechanism and each fine-z flexure mechanism is suspended from the rigid structure and actuated by a corresponding actuator, wherein the actuators allow independent movement and positioning of each fine-z mechanism and its associated scanning probe in multiple directions independent of the movement of the rigid structure;
positioning at least one of the scanning probes in relation to a position and a velocity of a sample by movement of the rigid structure;
fine positioning the at least one of the plurality of scanning probes in closer proximity to the sample, wherein the fine positioning is performed using the fine-z flexure mechanism of the at least one scanning probe and its corresponding actuator; and
performing metrology on the sample using the at least one scanning probe.

16. The method of claim 15, wherein at least one scanning probe comprises a micro-electro-mechanical-systems (MEMS) based scanning cantilever probe.

17. The method of claim 16, wherein the MEMS probe comprises a MEMS atomic force microscopy (AFM) probe.

18. The method of claim 15, wherein each of the scanning probes that comprise the plurality of scanning probes are adjusted individually with respect to the position and velocity of the sample.

19. The method of claim 15, wherein the sample is stationary relative to the plurality of scanning probes.

20. The method of claim 15, wherein the sample is moving relative to the plurality of scanning probes.

21. The method of claim 15, wherein the sample is rigid.

22. The method of claim 15, wherein the sample is flexible.

23. The method of claim 15, wherein at least one of the plurality of scanning probes comprise a cantilevered AFM tip and said method further comprises positioning the cantilever tip of the at least one scanning probe in proximity to the sample.

24. The method of claim 15, wherein a number of scanning probes that comprise the plurality of scanning probes is scalable.

25. The method of claim 24, wherein the plurality of scanning probes form an array of scanning probes.

26. The method of claim 15, wherein the method is used in a roll-to-roll manufacturing process.

27. A method of metrology for manufacturing comprising:
providing a structure positioning system that comprises a rigid structure that is supported at each end, wherein the rigid structure is actuated to alter a physical location of the rigid structure in at least two dimensions such that the rigid structure can be positioned relative to a direction of movement of a sample and a distance separating the rigid structure from the sample, and wherein the rigid structure is moved in multiple directions by one or more XZ actuators;
providing a plurality of atomic force microscopy (AFM) probes, wherein each of the plurality of AFM probes is attached to a corresponding fine-z flexure mechanism and each fine-z flexure mechanism is suspended from the rigid structure and actuated by a corresponding voice-coil actuator, wherein the voice-coil actuators allow independent movement and positioning of each fine-z mechanism and its associated AFM probe in multiple directions independent of the movement of the rigid structure;
coarse positioning of one or more of the individually actuated and controlled plurality of AFM probes to within approximately 250 µm of a sample using the one or more XZ actuators to move the rigid structure, wherein at least one of the one or more AFM probes comprise a probe used for metrology data acquisition;
fine positioning the one or more AFM probes in closer proximity to the sample, wherein fine positioning is performed using the fine-z flexure mechanism of the one or more AFM probes and their corresponding voice-coil actuators; and
performing metrology on the sample using the one or more AFM probes.

28. The method of claim 27, wherein the AFM probe used for metrology data acquisition is used to measure one or more of temperature, magnetic information, and electric charge.

* * * * *